United States Patent
Boughton et al.

(10) Patent No.: US 10,863,680 B2
(45) Date of Patent: Dec. 15, 2020

(54) IRRIGATION CONNECTORS (71) Applicant: SA EXEL INDUSTRIES, Paris (FR)

(72) Inventors: Robert Boughton, Twyford (GB); Matt Gossington, Handsacre (GB)

(73) Assignee: SA EXEL INDUSTRIES, Paris (FR)

( * ) Notice: Subject to any disclaimer, the term of this patent is extended or adjusted under 35 U.S.C. 154(b) by 155 days.

(21) Appl. No.: 15/562,774

(22) PCT Filed: Mar. 24, 2016

(86) PCT No.: PCT/GB2016/050843
§ 371 (c)(1),
(2) Date: Sep. 28, 2017

(87) PCT Pub. No.: WO2016/156814
PCT Pub. Date: Oct. 6, 2016

(65) Prior Publication Data
US 2018/0359961 A1 Dec. 20, 2018

(30) Foreign Application Priority Data
Apr. 2, 2015 (GB) .................................. 1505751.6

(51) Int. Cl.
*A01G 25/02* (2006.01)
(52) U.S. Cl.
CPC ........... *A01G 25/02* (2013.01); *A01G 25/023* (2013.01); *Y10T 137/6123* (2015.04)
(58) Field of Classification Search
CPC .. A01G 25/023; A01G 25/02; Y10T 137/6123
See application file for complete search history.

(56) References Cited

U.S. PATENT DOCUMENTS

| 3,361,363 A | 1/1968 | Babington |
| 3,806,031 A | 4/1974 | Olson |
(Continued)

FOREIGN PATENT DOCUMENTS

| CN | 2358311 Y | 1/2000 |
| DE | 9007363 U1 | 6/1991 |
(Continued)

OTHER PUBLICATIONS

Patent Cooperation Treaty, Notification of Transmittal of the International Search Report and the Written Opinion of the International Searching Authority, or the Declaration for PCT/GB2016/050843 dated Jul. 18, 2016, 13 pages.
(Continued)

*Primary Examiner* — Kevin R Barss
(74) *Attorney, Agent, or Firm* — Heslin Rothenberg Farley & Mesiti P.C.; Victor A. Cardona, Esq.

(57) ABSTRACT

An irrigation connector for tapping into a water supply hose includes a retaining portion for holding a supply hose in a hose receiving region of the retaining portion and a hollow needle mounted for movement relative to the retaining portion. The needle can move between a retracted position and an extended position in which the needle extends into the hose receiving region for penetrating a supply hose held in the retaining portion to create a fluid communication path between an interior of the needle and an interior of a supply hose held in the retaining portion. The connector includes a needle drive arrangement for driving the needle towards the extended position.

24 Claims, 10 Drawing Sheets

(56) References Cited

U.S. PATENT DOCUMENTS

| | | | |
|---|---|---|---|
| 3,966,233 | A | 6/1976 | Diggs |
| 3,973,732 | A | 8/1976 | Diggs |
| 4,611,624 | A | 9/1986 | Snyder et al. |
| 5,105,844 | A | 4/1992 | King |
| 5,211,426 | A | 5/1993 | Guignard et al. |
| 6,216,723 | B1 | 4/2001 | King |
| 6,820,647 | B1 * | 11/2004 | Grecco ................ F16K 31/041 137/137 |
| 6,986,532 | B1 | 1/2006 | King |
| 7,066,403 | B2 * | 6/2006 | Heren .................... A01G 25/02 239/271 |
| 2001/0032667 | A1 | 10/2001 | King et al. |
| 2003/0111550 | A1 * | 6/2003 | Kuo ...................... B05B 15/654 239/240 |
| 2004/0089738 | A1 | 5/2004 | Heren et al. |
| 2006/0065306 | A1 | 3/2006 | Mortensen |
| 2006/0169805 | A1 | 8/2006 | Dabir et al. |
| 2018/0281009 | A1 * | 10/2018 | Boughton .............. A01G 25/02 |

FOREIGN PATENT DOCUMENTS

| | | |
|---|---|---|
| EP | 0598676 A1 | 5/1994 |
| FR | 2503534 A1 | 10/1982 |
| FR | 2722646 A1 | 1/1996 |
| GB | 1382110 | 1/1975 |
| WO | 2010127711 A1 | 11/2010 |
| WO | 2010127914 A1 | 11/2010 |
| WO | 2010133236 A1 | 11/2010 |

OTHER PUBLICATIONS

GB Intellectual Property Office, Search Report under Section 17 for GB Application No. 1505751.6 dated Sep. 4, 2015, 2 pages.

Karcher Company products: Karcher Rain System; Drip Nozzle; and Micro Spray Nozzle from http://www.karcher.co.uk/uk/Products/Home_Garden/Watering_systems/Products on Aug. 18, 2014, 3 pages.

Notice of the First Office Action (English translation) in corresponding Chinese patent application dated Oct. 25, 2019.

* cited by examiner

IRRIGATION CONNECTORS

CROSS REFERENCE TO RELATED APPLICATIONS

This application is a national stage filing under section 371 of International Application No. PCT/GB2016/050843, filed on Mar. 24, 2016, published in English on Oct. 6, 2016, as WO2016/156814 A1 and which claims priority to Great Britain Application No. 1505751.6, filed on Apr. 2, 2015, the entire disclosure of these applications being hereby incorporated herein by reference.

TECHNICAL FIELD

This invention relates to irrigation connectors for use in domestic garden irrigation systems, sometimes termed micro irrigation systems.

BACKGROUND

Such systems can be useful for the consumer in providing a permanent or semi-permanent watering arrangement for use in gardens, allotments, and so on.

However existing micro irrigation systems are generally difficult to set up, install and change. Typically, a large number of different products/components are required in order to set up even a relatively simple micro-irrigation system, and time consuming and fiddly operations are required by a user in installing such a system.

It would be desirable to provide an irrigation system or parts for use in an irrigation system, which can provide easy and safe set up, as well as an effective resulting system.

SUMMARY

According to a first aspect of the invention there is provided an irrigation connector for tapping into a water supply hose, the connector comprising a retaining portion for holding a supply hose in a hose receiving region of the retaining portion and a hollow needle mounted for movement relative to the retaining portion between a retracted position and an extended position in which the needle extends into the hose receiving region for penetrating a supply hose held in the retaining portion to create a fluid communication path between an interior of the needle and an interior of a supply hose held in the retaining portion.

This can lead to connectors which are particularly safe and convenient to use.

When in the retracted position, the whole needle may be outside of the hose receiving region.

The distal end of the needle may be concealed when the needle is in the retracted position.

The connector may comprise a needle holder for holding the needle.

The connector may comprise a needle guide portion for guiding the needle between the retracted position and the extended position.

The connector may comprise a needle housing portion for housing the needle in the retracted position.

The needle housing portion may be held in a fixed relation to the retaining portion The needle housing portion may comprise the needle guide portion.

The connector may comprise a needle drive arrangement for driving the needle towards the extended position.

The drive arrangement may comprise a drive collar for driving the needle relative to the needle housing portion.

The needle housing portion and drive collar may have respective corresponding camming portions arranged so that a rotational movement of the drive collar relative to the housing portion causes axial movement of the needle between the retracted position and the extended position.

This can further improve ease of use, making it easier to drive the needle through the wall of a supply hose.

The corresponding camming portions may comprise a twin start helix provided on one of the housing portion and the drive collar and respective follower projections on the other of the housing portion and the drive collar.

The needle housing portion and drive collar may have respective corresponding detent portions for resisting movement of the drive collar relative to the housing portion, when the needle is in the extended position, which movement would serve to retract the needle.

This can reduce the risk of accidental retraction of the needle.

At least a portion of the needle housing portion may be of a different colour than the retaining portion and/or drive collar to help provide a visual indication of when the needle is not in the fully extended position by virtue of drive collar being in such a position as to expose said different colour portion.

The retaining portion and needle housing portion may be a two shot injection moulded plastics component. In such a case the plastics material used in each "shot" may be different than the other to provide the difference in colour mentioned above.

The hose receiving region of the retaining portion may bounded by an encircling hose supporting surface.

The retaining portion can be considered to have an axis defined by the axis of the encircling hose supporting surface. This axis will generally be aligned with an axis of supply hose which is held in the retaining portion.

The hose supporting surface may be generally cylindrical.

The needle may be arranged to pass through the hose supporting surface when in the extended position. In the retracted position, the needle may be disposed so that no part of the needle projects beyond the hose supporting surface.

At least when in the extended position, preferably the needle extends in a generally radial direction relative to the axis of the retaining portion.

The drive mechanism may be arranged so that whilst axial drive is transferred to the needle, the drive collar is arranged to rotate freely relative to the needle.

This can help reduce risk of wear and/or damage to the needle.

The connector may comprise a water outlet portion for accepting water from the interior of the needle and passing water out of the connector.

The water outlet portion may comprise the needle holder.

The drive mechanism may be arranged so that whilst axial drive is transferred to the needle, the drive collar is arranged to rotate freely relative to the water outlet portion.

This can be helpful as it means that the water outlet portion does not need to rotate as the drive collar is operated, which in turn means that any components, such as tubing, connected to the water outlet portion avoid being twisted as the drive collar is operated.

The water outlet portion may be keyed with the retaining portion to resist relative rotation between the retaining portion and the water outlet portion. This can further assist in avoiding rotation of the water outlet portion when the drive collar is operated.

More specifically, keying may be provided between the needle holder and the needle housing portion with relative rotation thereby resisted but relative axial movement allowed. At least one interengaging rib and groove pair may be provided for keying the needle holder with the needle housing portion.

The connector may comprise a releasable safety lock for selectively blocking movement of the needle from the retracted to the extended position.

In some embodiments the safety lock comprises a moveable plate having a needle blocking portion and including an aperture through which the needle may pass, the moveable plate being moveable between a first, blocking, position where the needle blocking portion blocks movement of the needle towards the extended position and a second position where the needle can pass through the aperture.

The moveable plate may be biased towards the blocking position. The moveable plate may comprise a spring portion for providing said bias. The blocking portion and the spring portion may be of a single piece of material.

The safety lock may be arranged so that presence of the needle in the aperture when the needle is in the extended position is sufficient to hold the plate in the second position against the biasing action.

The retaining portion may comprise a door portion moveable between a closed position and an open position which creates an opening in the hose supporting surface for allowing introduction and removal of a length of supply hose and the connector may be arranged to block opening of the door portion when the needle is in the extended position.

The needle drive arrangement may be arranged to block opening of the door portion when the needle is in the extended position.

Where the needle drive arrangement comprises a drive collar, the drive collar may be arranged to block opening of the door portion when the drive collar is in a position corresponding to the needle being in the extended position.

The door portion may be arranged to latch with the remainder of the retaining portion when in the closed position and the drive collar may block unlatching of the door portion when the drive collar is in a position corresponding to the needle being in the extended position.

The water outlet portion may comprise a sealing clamp arrangement for connecting an outlet component to the irrigation connector.

According to a second aspect of the invention there is provided an irrigation connector for tapping into a water supply hose, the connector comprising a retaining portion for holding a supply hose, a hollow needle for penetrating a supply hose held in the retaining portion to create a fluid communication path between an interior of the needle and an interior of a supply hose held in the retaining portion and the connector further comprising a water outlet portion for accepting water from the interior of the needle and passing water out of the connector, wherein the water outlet portion comprises a sealing clamp arrangement for connecting an outlet component to the irrigation connector.

The outlet component may comprise irrigation hose or tubing, a sprinkler unit, a dripper unit or so on.

The sealing clamp arrangement may comprise a tubular sealing element having an internal surface for sealing against an inserted outlet component, a seat portion receiving the tubular sealing element and comprising a plurality of resilient finger portions for acting on an external surface of the sealing element and a clamping nut for driving the resilient finger portions inwardly towards the axis of the sealing element as the clamping nut is tightened onto the seat portion to compress the sealing element into contact with an inserted outlet component.

With such a construction the sealing clamp can allow sealing connection to tubing or hose as the outlet component if the user desires or similarly allow sealing connection to a dripper unit or sprinkler unit if the user desires. Thus the irrigation connector can allow connection of tubing to the supply hose or connection of say a dripper directly to the supply hose.

Note that these further features may be found in the sealing clamp arrangement of the second aspect of the invention or that of the above mentioned optional feature for use with the first aspect of the invention.

According to another aspect of the invention there is provided an irrigation connector arrangement comprising an irrigation connector as defined in any one of the aspects and optional features above and at least outlet component mounted in the outlet portion.

According to another aspect of the invention there is provided an irrigation connector arrangement comprising an irrigation connector, as defined in any one of the aspects and optional features above, and a ground spike for securing the needle connector in position.

The irrigation connector and spike may comprise complementary attachment portions allowing the connector to be mounted on the spike and the orientation of the connector to be varied relative to the spike.

In some embodiments the attachment portion on the connector extends at least part way around the retaining portion so as to present a plurality of different angularly spaced attachment regions at which the attachment portion of the spike may be selectively located.

The attachment portion on the connector may comprise a runner accepted in a slot in the attachment portion on the spike.

The complementary attachment portions may comprise indexing means for indexing relative movement of the attachment portions as the orientation of the connector is altered relative to the spike.

The indexing means may comprise a series of projections and recesses on the attachment portion provided on the connector, and a projection on the attachment portion on the spike, which is arranged to ride over a respective one of the projections on the connector as the connector is moved from one indexed position, determined by a respective recess to another.

According to another aspect of the invention there is provided an irrigation connector kit comprising an irrigation connector, as defined in any one of the aspects and optional features above, and at least two outlet components, each arranged for selective mounting in the outlet portion, one of the outlet components being hose or tubing and another being a dripper unit or a sprinkler unit.

According to another aspect of the invention there is provided an irrigation system comprising a supply hose, at least two irrigation connectors as defined in any one of the aspects and optional features above, each irrigation connector being mounted on the supply hose with the supply hose held in the retaining portion and a fluid communication path created between an interior of the needle and an interior of the supply hose, wherein hose or tubing is held in the water outlet portion of one of the irrigation connectors and a dripper unit or sprinkler unit is held in the water outlet portion of another of the irrigation connectors.

BRIEF DESCRIPTION OF THE DRAWINGS

Embodiments of the present invention will now be described by way of example only, with reference to the accompanying drawings, in which:

FIGS. 4A to 4D show parts of the irrigation connector of FIGS. 3A and 3B in more detail. FIG. 4A shows the irrigation connector with a hollow needle in a retracted position, whilst FIG. 4B shows the irrigation connector with the needle in an extended position.

DETAILED DESCRIPTION

Figure 1:
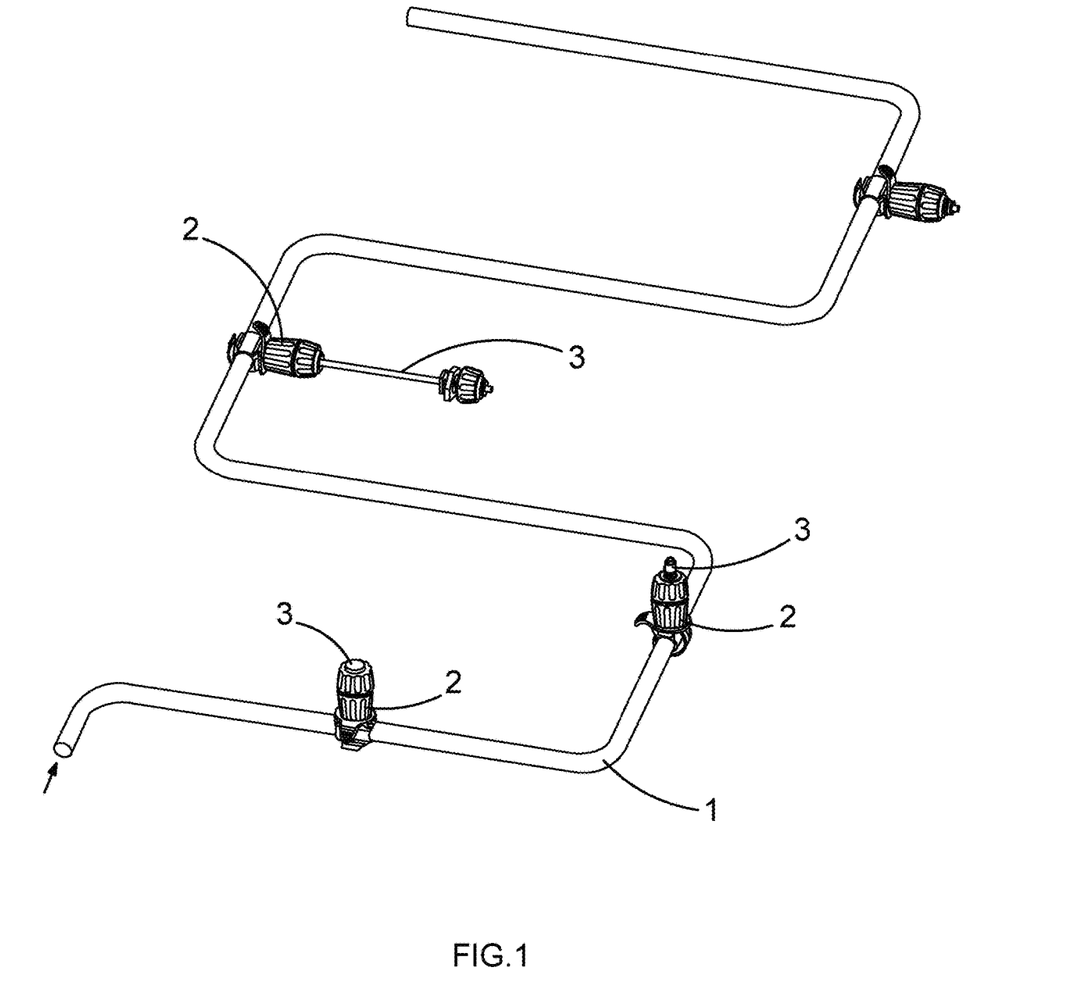
FIG. 1 schematically shows a micro irrigation system.

FIG. 1 schematically shows a micro irrigation system of the type which may be used for watering plants in, for example, a domestic garden or other similar situation. The micro irrigation system comprises a supply hose 1 which is connected to a water supply (not shown). Mounted on the supply hose 1 are a plurality of irrigation connector arrangements 2 which serve to make a connection to the water supply hose such that water flowing in the water supply hose can be tapped off by the irrigation connector arrangement 2 and allowed to leave the supply hose 1 for watering purposes. Each irrigation connector arrangement 2 may have connected to it a respective water outlet component 3, such as for example a further length of hose or tubing, a dripper unit, a sprinkler unit, or so on.

In such an irrigation system, the water supply hose 1 and outlet components 3 may be standard commercially available products. For example the water supply hose 1 may be a length of standard garden hose.

Figure 2:
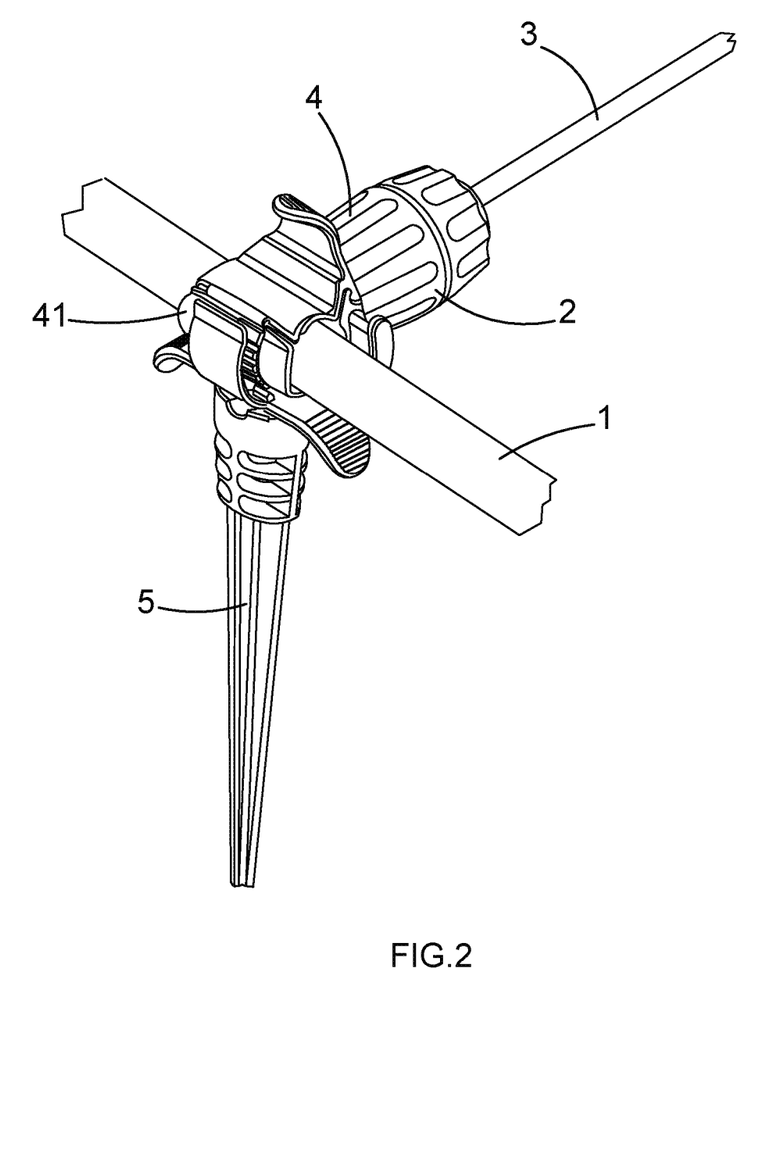
FIG. 2 schematically shows one irrigation connector arrangement mounted on a supply hose which together form part of the irrigation system shown in FIG. 1.
Figure 3A:
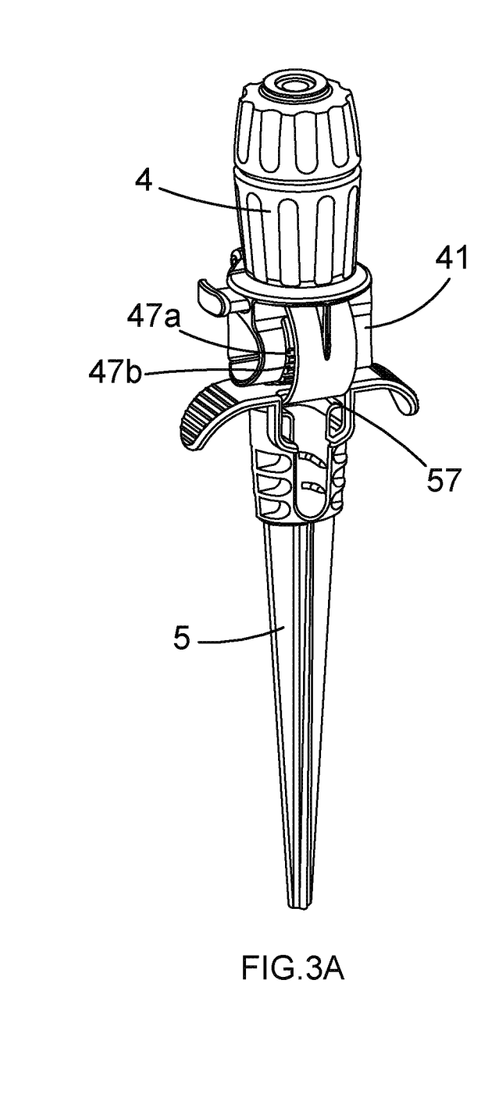
FIGS. 3A and 3B schematically show a needle connector arrangement of the type used in the irrigation system of FIG. 1 in isolation, with FIG. 3A showing an irrigation connector of the irrigation connector arrangement in a vertical orientation, and FIG. 3B showing the irrigation connector in a horizontal orientation.
Figure 3B:
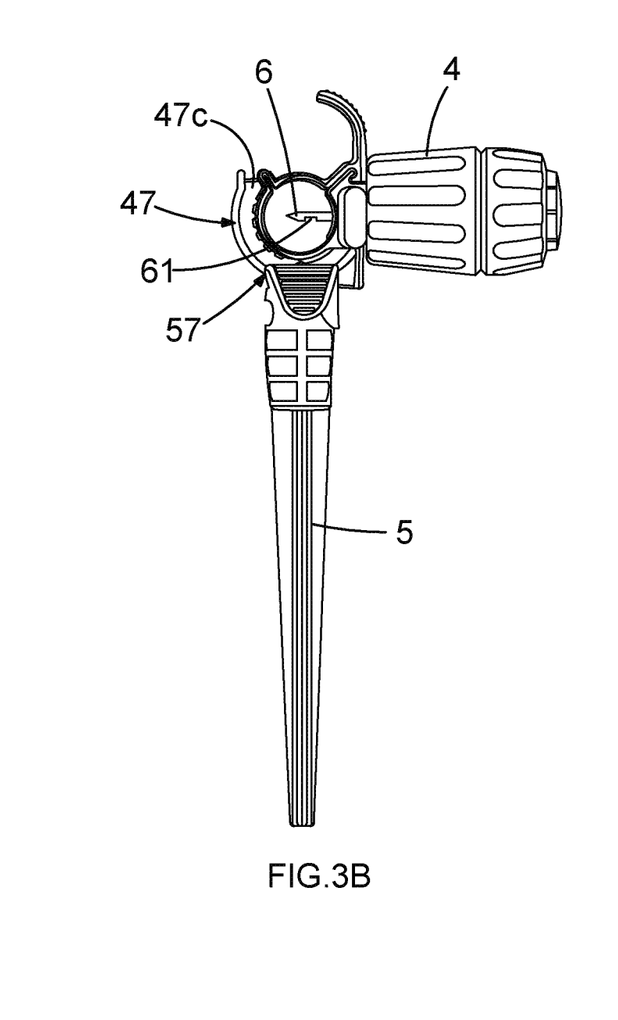

FIG. 2 shows one of the irrigation connector arrangements of FIG. 1 in more detail whilst mounted on the water supply hose 1. On the other hand, FIGS. 3A and 3B show the irrigation connector arrangement in isolation.

The irrigation connector arrangement comprises irrigation connector 4 mounted to a ground spike 5 for securing the irrigation connector 4 and hence a carried supply hose in position as schematically illustrated in FIGS. 1 and 2. In the present embodiment the irrigation connector 4 is arranged for movement relative to the ground spike 5, such that the irrigation connector 4 may be orientated at different orientations relative to the spike 5. For example in FIG. 3A the irrigation connector 4 is shown in an upright (or vertical) position whereas in FIG. 3B the irrigation connector 4 is shown in a horizontal position.

The irrigation connector 4 comprises a hose retaining portion 41 for holding the supply hose 1 as shown in FIGS. 1 and 2. The needle connector 4 further comprises a hollow needle 6 with an open side window 61, which is arranged for projecting into a hose receiving region of the hose retaining portion 41, so as to penetrate into the interior of a supply hose 1 when located in the hose retaining portion 41.

As will be described in more detail below, the irrigation connector 4 comprises a drive mechanism for driving the hollow needle 6 from a retracted position where the needle 6 does not extend into the hose receiving region towards the extended position shown in FIG. 3B where it can penetrate through the wall of a carried supply hose.

Figure 4A:
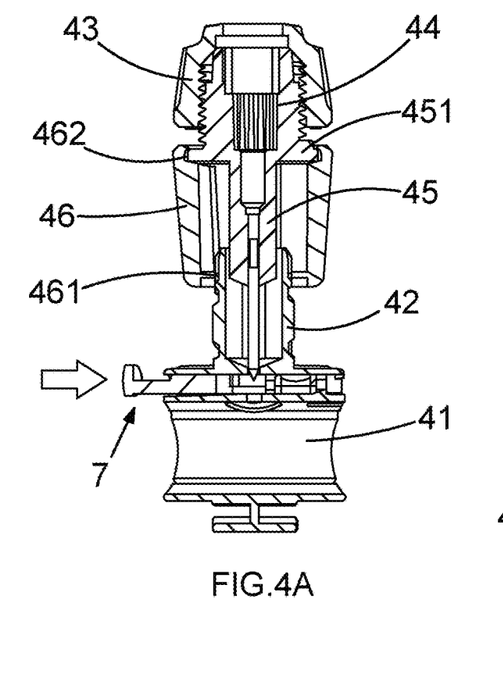

Referring now to FIGS. 4A to 4D as well as FIGS. 3A and 3B, the irrigation connector 4 comprises a needle housing portion 42 in which the needle 6 is housed in a retracted position as shown in FIG. 4A and which, in the present embodiment, is formed together as one moulding with the hose retaining portion 41. The irrigation connector 4 also comprises a water outlet portion 43 which comprises a sealing clamp portion 44 for connecting an outlet component 3 such as a dripper, sprinkler unit or tubing to the irrigation connector 4 and a needle holding portion 45 for holding the hollow needle 6.

The distal end of the needle 6 is concealed when in the retracted position which helps prevent accidental injury and damage (to the needle and/or other objects).

The needle holding portion 45 and clamping portion 44 have a hollow interior which is connected to the hollow interior of the hollow needle 6, such that when the hollow needle 6 penetrates into the interior of a carried supply hose 1, there is a fluid communication path between the interior of the supply hose 1 and the interior of the irrigation connector 4 and any water outlet component 3 (see FIGS. 1 and 2) held in the irrigation connector 4.

Figure 4B:
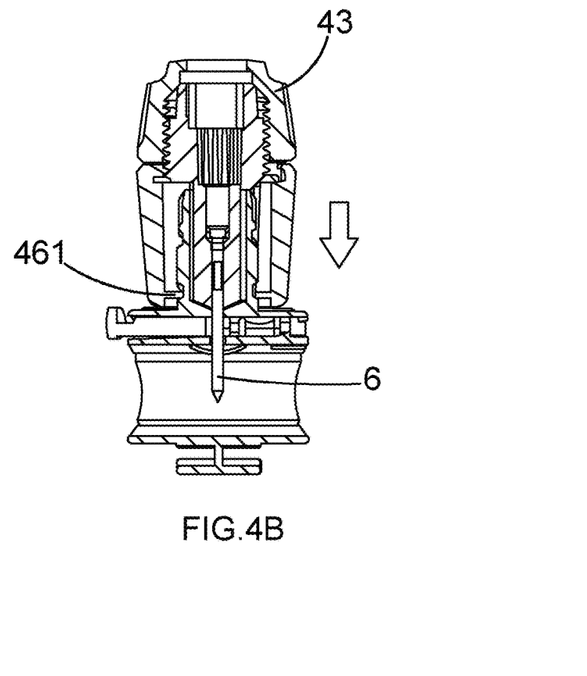

The irrigation connector 4 comprises a drive collar 46 for use in driving the needle 6 between the retracted position shown in FIG. 4A and the extended position shown in FIG. 4B (and for example 3B). The drive collar 46 is arranged to act on the needle holding portion 45.

Figure 4C:
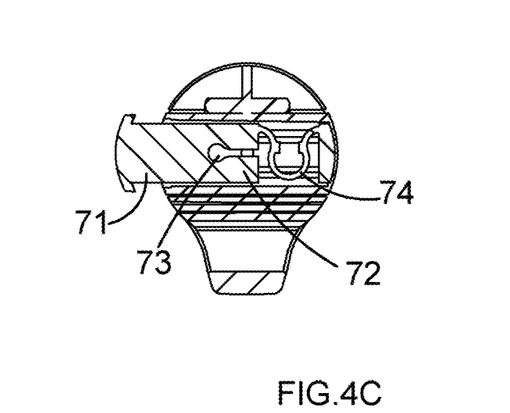
FIG. 4C shows a safety lock for blocking movement of the needle from the retracted position shown in FIG. 4A
Figure 4D:
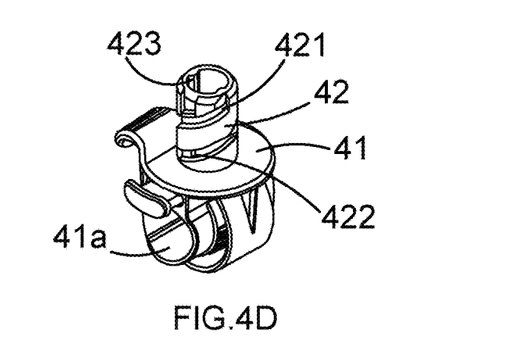
FIG. 4D shows a subpart of the irrigation connector in isolation.

The hose retaining portion 41 and needle housing portion 42 are formed in one piece in the present embodiment and are shown together in FIG. 4D. Some features of the needle housing portion 42 are best seen in this Figure.

The needle housing portion 42 carries a two start helix 421 and the drive collar 46 has a corresponding pair of follower projections 461, which run in the two start helix 421, such that rotational movement of the drive collar 46 around the axis of the needle housing portion 42 will cause axial movement of the drive collar 46, and hence needle holder portion 45 and needle 6, relative to the needle housing portion 42. The two start helix 421 is arranged so that a 270° rotation of the drive collar 46 moves the needle 6 from the retracted to the extended position.

Each track in the two start helix 421 comprises a corresponding detent portion 422 (one of which can be seen in FIG. 4D) over which the respective follower projection 461 rides as the drive collar 46 moves to the end of the helix 421 corresponding to the needle 6 being in the extended position. This detent portion 422 co-operates with the respective follower projection 461 as interacting detent portions to provide resistance against movement of the drive collar 46 away from this position that corresponds to the needle 6 being fully extended. This helps prevent accidental movement of the needle 6 away from the extended position.

In alternatives a different form of drive mechanism may be provided—for example in one alternative the drive collar may run on a more conventional thread requiring multiple turns between the retracted and extended position; or in another the user may have to push the needle into the extended position by sliding the drive collar forwards without the mechanical advantage provided by camming portions such as a thread or two start helix.

In alternatives at least part of the external surface of the needle housing portion 42 may be of a different colour than the drive collar 46 and/or hose retaining portion 41. This can help indicate when the needle 6 is in the retracted position. In such a case the needle housing portion 42 may be part of a "two shot" injection moulded component.

The irrigation connector 4 is constructed so that the needle housing portion 42 is provided within the drive collar 46 and the needle holding portion 45 is provided within the needle housing portion 42. These portions may all be generally cylindrical and arranged concentrically one inside the other.

Figure 5A:
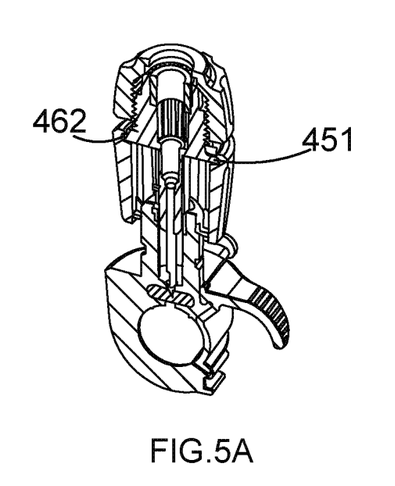
FIGS. 5A and 5B show cutaway portions of the irrigation connector shown in FIGS. 3A and 3B, illustrating anti-rotation features.

Whilst the drive collar 46 is arranged to act on the needle holding portion 45 for providing axial drive, the drive collar 46 is free to rotate relative to the needle holding portion 45. As can be seen in FIGS. 4A, 4B and 5A, the needle holding portion 45 comprises a flange portion 451 which resides in a corresponding annular recess 462 in the drive collar 46. This annular recess 462 allows rotation of the flange portion 451 relative thereto whilst axial movement between the flange portion 451 and the annular recess 462 is resisted.

It is desirable that the needle holding portion 45 and hence the water outlet portion 43 do not rotate with the drive collar 46 when the irrigation connector is operated to drive the needle 6 into a supply hose 1. This is because it means that rotation of any outlet components connected to the water outlet portion 43 is avoided. It will be seen that this is particularly attractive where the water outlet component may be tubing to which other parts are connected.

To further help ensure against rotation of the water outlet portion 43 when the irrigation connector 4 is operated, keying is provided between the water outlet portion 43 and the needle housing portion 42 and hence hose retaining portion 41.

Figure 5B:
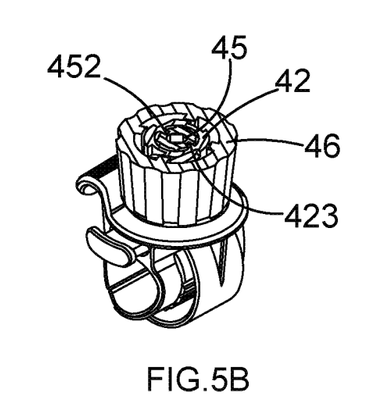

Anti-rotation ribs 423 are provided on the internal surface of the needle housing portion 42, as may be seen in FIGS. 4D, 5A and 5B. These are received in respective receiving grooves 452 provided in the needle holding portion 45. Thus the water outlet portion 43 will tend to be held against rotation relative to the hose retaining portion 41 and hence the supply hose 1 when the irrigation connector is mounted in position on a supply hose 1.

The irrigation connector 4 comprises a safety lock 7 as may be best seen in FIGS. 4A to 4C which is provided to help against accidental exposure of the needle 6. The safety lock 7 comprises a moveable plate 71 with a needle blocking portion 72 and defining a needle accepting aperture 73. The moveable plate 71 is housed in the hose retaining portion 41.

The moveable plate 71 is moveable between a position in which the needle blocking portion 72 blocks movement of the needle 6 away from the retracted position shown in FIG. 4A towards the extended position shown in FIG. 4B. On the other hand when the moveable plate 71 is moved so that the needle accepting aperture 73 is aligned with the needle 6, the needle 6 may be moved from the retracted position as shown in FIG. 4A to the extended position as shown in FIG. 4B with the needle 6 passing through the aperture 73.

The safety lock also comprises a spring means 74 for biasing the moveable plate 71 to the blocking position. In the present embodiment the spring means 74 is formed as an integral spring as part of the moveable plate 71. That is to say movement of the moveable plate 71 is allowed by deformation of the spring portion 74 of the plate material. When the needle 6 is in the extended position passing through the needle accepting aperture 73, the moveable plate 71 is held in position against action of the spring 74 by virtue of the needle 6 residing in the aperture 73.

Thus in operation a user depresses the safety lock 7 against the action of the spring portion 74, aligning the needle accepting aperture 53 with the needle 6, allowing subsequent movement of the needle 6 from the retracted position shown in FIG. 4A, towards the extended position shown in FIG. 4B, by use of the drive mechanism, in particular, by rotation of the drive collar 46.

Figure 6A:
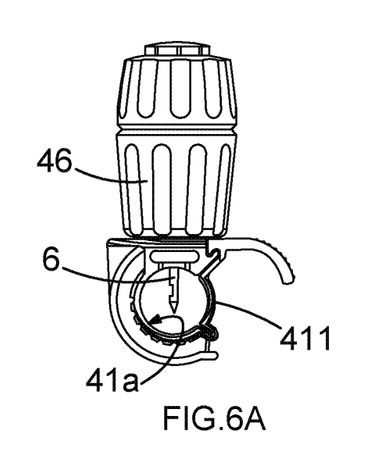
FIGS. 6A and 6B show the irrigation connector of FIGS. 3A and FIG. 3B with a door portion of a retainer clip of the irrigation connector in a closed position in FIG. 6A and an open position in FIG. 6B.
Figure 6B:
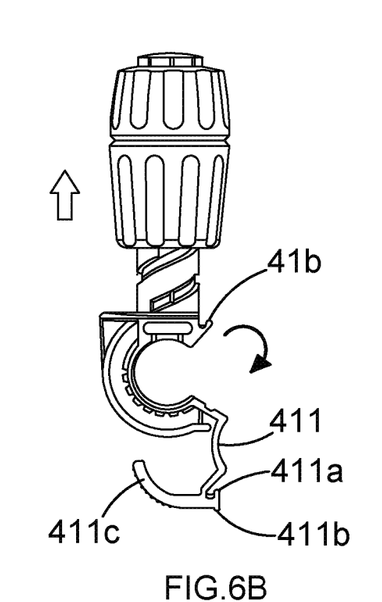

Referring now particularly to FIGS. 6A and 6B, the hose retaining portion 41 defines a generally cylindrical hose receiving region and has an internal generally cylindrical hose supporting surface 41a (also visible for example in FIG. 4D). The hose retaining portion 41 comprises a door portion 411 which is moveable between a closed position as shown in, for example, FIG. 6A and an open position as shown in FIG. 6B. The door portion 411 is joined to the remainder of the hose retaining portion 41 via a plastic hinge. When in the open position, as shown in FIG. 6B, an opening is created in the hose retaining portion 41, and in particular in the hose supporting wall 41a, though which a length of supply hose 1 may be inserted (by movement in a radial direction of the hose). Once the hose 1 is in position in the hose receiving region the door portion 411 may be closed. Thus this door portion 411 provides a convenient way for mounting the irrigation connector 4 on the supply hose 1. The door portion 411 is arranged to latch into the closed position with the remainder of the hose retaining portion 41 by virtue of inter engaging latching portions 411a and 41b.

The irrigation connector 4 is arranged to help prevent accidental opening of the door portion 411 when the needle 6 is in the extended position, as shown in FIG. 6A. In the present embodiment this is achieved by virtue of the fact that when the drive collar 46 is in the position corresponding to the needle 6 being extended, as shown in FIG. 6A, the drive collar 46 obstructs opening of the door portion 411. In particular the drive collar 46 is disposed so as to resist unlatching of the inter engaging portions 41b and 411a. On the other hand when the drive collar 46 is moved to the position as shown in FIG. 6B, corresponding to the needle 6 being in the retracted position, the drive collar 46 no longer obstructs opening of the door portion 411.

The door portion 411 may comprise a tab portion 411c for use in opening the door portion 411. In opening the door portion 411 the user may depress the door portion tab 411c in a direction away from the drive collar 46, which tends to cause the respective engaging portion 411a to move upwards out of engagement with the corresponding engagement portion 41b of the remainder of the hose retaining portion 41 if the door portion 411 is to be unlatched. With the drive collar 46 in the position corresponding to the needle 6 being extended, this upward movement is effectively blocked.

In the present embodiment, to further resist undesired opening of the door portion 411, the door portion carries a projection 411b which engages with a corresponding recess (not shown) in the underside of the drive collar 46 when the drive collar 46 is in the position corresponding to the needle 6 being in the extended position.

It may be noted that axial drive of the needle 6 as referred to above corresponds, in the current embodiment, to movement of the needle 6 in a generally radial direction relative to a supply hose 1 held in the hose retaining portion 41. Further it corresponds to movement in a radial direction relative to the cylindrical hose receiving region and/or cylindrical hose supporting surface 41a.

Figure 7A:
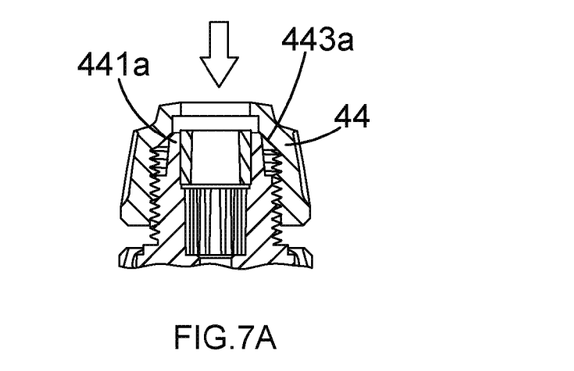
FIGS. 7A and 7B show detail of a water outlet portion of the irrigation connector shown in FIGS. 3A and 3B, with FIG. 7A showing the outlet portion without a component inserted into the outlet portion and FIG. 7B showing a component inserted into the outlet portion and clamped in position.
Figure 7B:
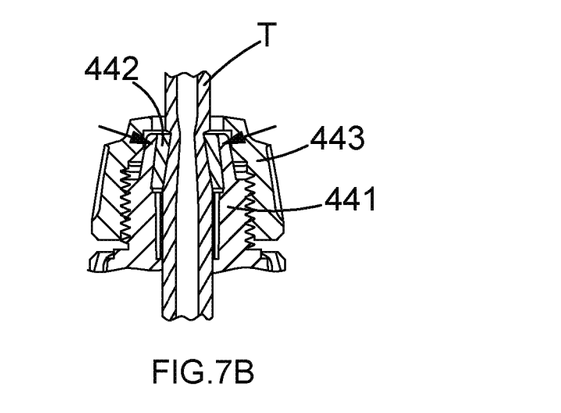

FIGS. 7A and 7B show more detail of the clamping portion 44 of the water outlet portion 43. The clamping portion comprises a threaded seat portion 441 comprising a plurality of deformable finger portions 441a. The seat portion 441 supports a tubular sealing element 442 so as to be surrounded by the finger portions 441a. A clamping nut 443 is provided which can be tightened onto the threaded seat portion 441 and which is arranged to act on the finger portions 441a. The clamping nut 443 has a chamfer portion 443a for acting on the distal ends of the finger portions 441a and tending to drive them inwards as the nut 443 is tightened onto the seat portion 441. With the clamping nut 443 in a non-tightened position, as shown in FIG. 7A, a water outlet component 3 may be introduced into the clamping portion 44 such that it resides within the tubular sealing element 442. As the nut 443 is tightened onto the seat 441 the plurality of fingers 441a are driven inwards under action of the clamping nut 443 forcing the tubular sealing element 442 into contact with a carried water outlet component, for example a length of tubing T, as illustratively shown in FIG. 7B.

This clamping arrangement means that watering outlet components 3 having a range of different external diameters may be sealingly connected with the outlet portion 43 to facilitate use of the irrigation connector with, for example, tubing having slightly different diameters as well as dripper components, sprinkler components and so on, which may all have different external diameters against which a seal needs to be made. Thus the irrigation connector 4 is multi-functional and helps minimise the number of different components that are needed to set up an irrigation system. A kit may comprise a number of irrigation connectors, irrigation tubing, and at least one dripper or sprinkler unit. Ground spikes and/or supply hose may also be included.

As mentioned above in relation to FIGS. 3A and 3B, the irrigation connector 4 is arranged to be orientatable at different angles relative to the ground spike 5. The ground spike 5 is shown in isolation in FIG. 8.

Figure 8:
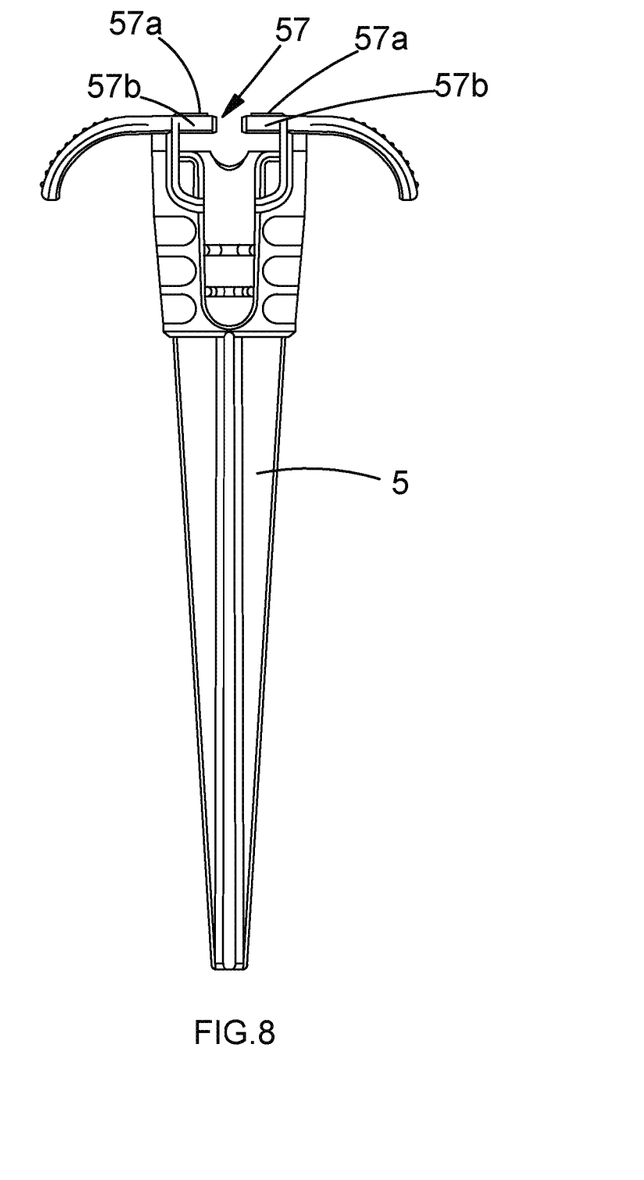
FIG. 8 shows a ground spike which forms part of the irrigation connector arrangement shown in FIGS. 3A and 3B in isolation.

The irrigation connector 4 and ground spike 5 comprise complementary attachment portions 47 and 57 which allow the connector 4 to be mounted on the spike 5 and the orientation of the connector 4 to be varied relative to the spike 5. The attachment portion 47 on the irrigation connector 4 extends part way round the retaining portion 41 so as to present a plurality of different angularly spaced attachments regions at which the attachment portion 57 of the spike may be selectively located.

The attachment portion 47 on the irrigation connector 4 comprises a runner 47 which is accepted in a slot 57 in the attachment portion on the spike 5.

The attachment portions 47, 57 comprise indexing means for indexing relative movement of the attachment portions as the orientation of the irrigation connector 4 is altered relative to the spike 5. The attachment portion 47 on the irrigation connector 4 comprises a series of projections and recesses 47a and 47b (see FIGS. 3A and 3B) and the attachment portion on the spike comprises a pair of projections 57a. The projections 57a on the spike 5 are arranged to ride over a respective one of the projections 47a on the irrigation connector 4 as the irrigation connector 4 is moved from one indexed position determined by respective one of the recesses 47b to another. When the spike 5 is mounted on the irrigation connector 4 the runner 47 is captured in the slot 57. The runner 47 is mounted on a supporting stem 47c and projects on either side of the stem. Arms 57b of the attachment portion 57 on the spike 5 wrap around the extending portions of the runner 47 to capture the runner 47. Resilience in the arms 57b allows the indexing movement. The projections 57a on the spike 5 act on a face of the retaining portion 41 which is opposite the extending portions of the runner.

Figure 9A:
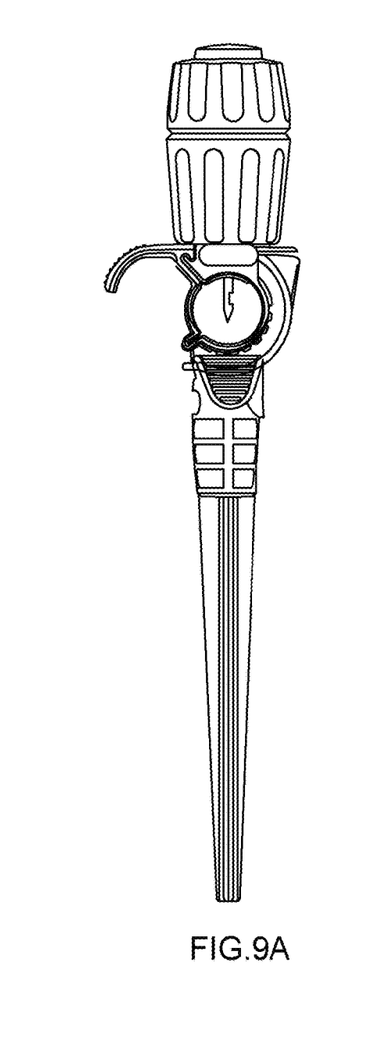
FIGS. 9A-9E show the irrigation connector arrangement of FIGS. 3A and 3B installed in different configurations on a supply hose.
Figure 9B:
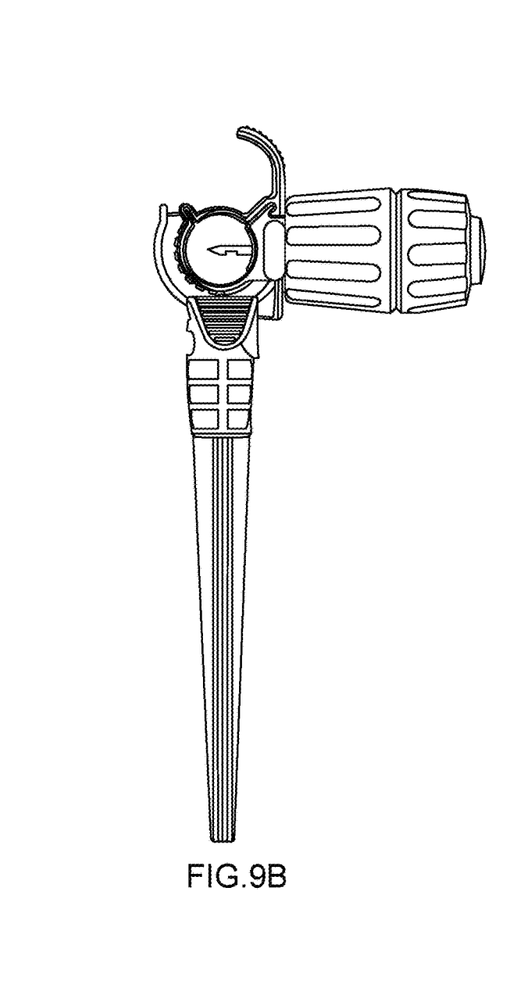
Figure 9C:
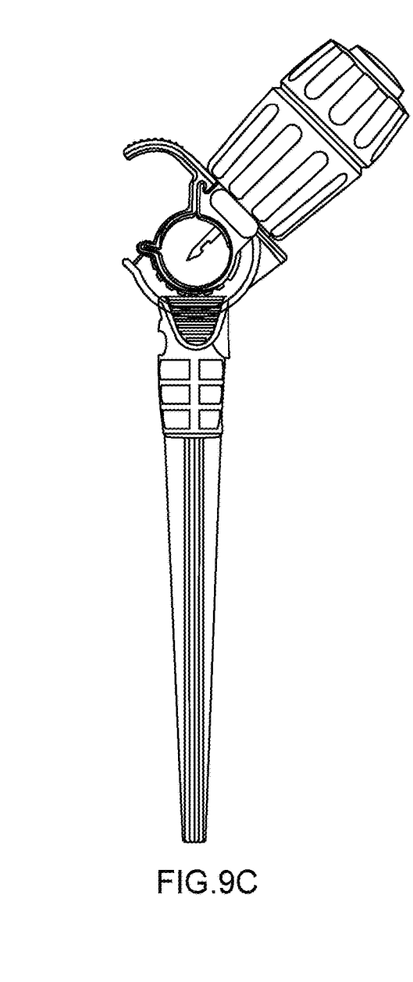
Figure 9D:
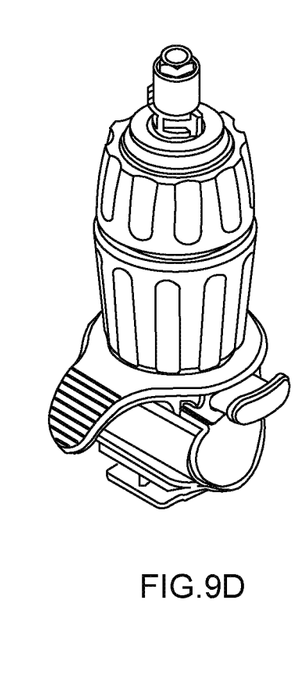
Figure 9E:
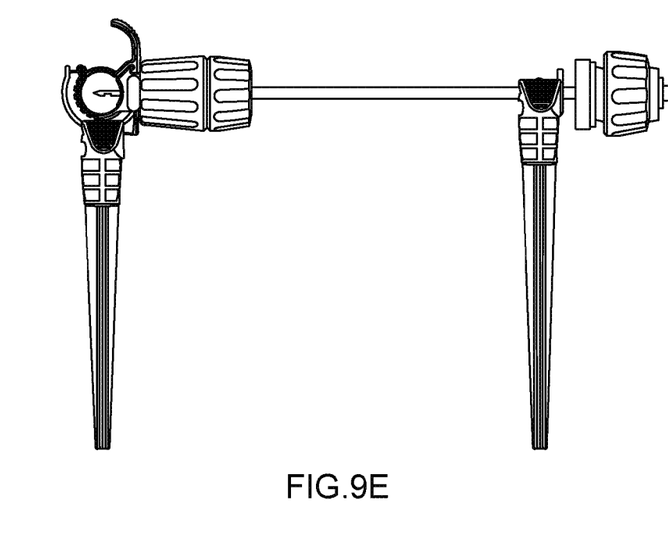

FIGS. 9A to 9E show the irrigation connector arrangement of FIGS. 3A and 3B in different orientations and configurations. FIG. 9A shows the irrigation connector arrangement in a vertical (or upright) configuration. FIG. 9B shows the irrigation connector arrangement in a horizontal (or transverse) orientation. FIG. 9C shows the irrigation connector arrangement in a 45° orientation. FIG. 9D shows the irrigation connector arrangement in a vertical (or upright) configuration with a sprinkler mounted in the water outlet portion 43. FIG. 9E shows the irrigation connector arrangement in a horizontal (or transverse) arrangement with a micro tube fitted to the water outlet portion 43, which tube leads to a stand alone dripper unit.

Figure 10:
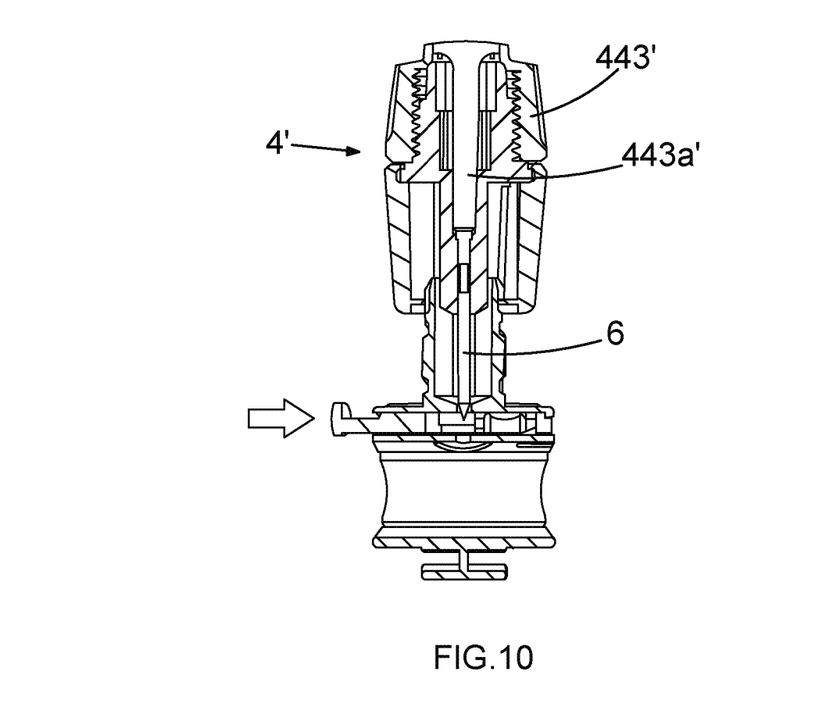
FIG. 10 shows a modified irrigation connector.

FIG. 10 shows a modified irrigation connector 4'. This is the same as the irrigation connector 4 described above except that the clamping nut 443 is replaced by a shrubbler nut 443'. The shrubbler nut 443' allows the irrigation connector 4 to act as a mini sprinkler without using additional components. When tightened right down, a central pin 443a' of the nut 443' seals the connector by virtue of the pin 443a' blocking the end of the needle 6 so that no water escapes. As the nut is loosened, water is allowed to escape from holes (not shown) in the nut head forming a mini sprinkler.

In a further alternative a dripper nut operating on a similar principle may be provided instead of or as well as (for interchangeable use) the shrubbler nut.

The invention claimed is:

1. An irrigation connector for tapping into a water supply hose, the connector comprising:
    a retaining portion for holding a supply hose in a hose receiving region of the retaining portion;
    a hollow needle mounted for movement relative to the retaining portion between a retracted position in which the distal end of the needle is concealed and an extended position in which the needle extends into the hose receiving region for penetrating a supply hose held in the retaining portion to create a fluid communication path between an interior of the needle and an interior of a supply hose held in the retaining portion, wherein the hose receiving region is bounded by an encircling hose supporting surface and the retaining portion comprises a door portion moveable between a closed position and an open position which creates an opening in the hose supporting surface for allowing introduction and removal of a length of supply hose;

a needle drive arrangement for driving the needle towards the extended position;

a needle housing portion for housing the needle in the retracted position; and the drive arrangement comprising a drive collar for driving the needle relative to the needle housing portion; and the drive arrangement being arranged so that while axial drive is transferred to the needle, the drive collar is arranged to rotate freely relative to the needle.

2. An irrigation connector according to claim 1 comprising a water outlet portion for accepting water from the interior of the needle and passing water out of the connector.

3. An irrigation connector according to claim 2 in which the water outlet portion is keyed with the retaining portion to resist relative rotation between the retaining portion and the water outlet portion.

4. An irrigation connector according to claim 2 in which the water outlet portion comprises a sealing clamp arrangement for connecting an outlet component to the irrigation connector.

5. An irrigation connector according to claim 1 which comprises a needle housing portion for housing the needle in the retracted position.

6. An irrigation connector according to claim 1 in which the needle housing portion and drive collar have respective corresponding camming portions arranged so that a rotational movement of the drive collar relative to the housing portion causes axial movement of the needle between the retracted position and the extended position.

7. An irrigation connector according to claim 6 in which the corresponding camming portions comprise a twin start helix provided on one of the housing portion and the drive collar and respective follower projections on the other of the housing portion and the drive collar.

8. An irrigation connector according to claim 1 in which the needle housing portion and drive collar have respective corresponding detent portions for resisting movement of the drive collar relative to the housing portion, when the needle is in the extended position, which movement would serve to retract the needle.

9. An irrigation connector according to claim 1 in which at least a portion of the needle housing portion is of a different color than the retaining portion and/or the drive collar to help provide a visual indication of when the needle is not in the fully extended position by virtue of drive collar being in such a position as to expose said different color portion.

10. An irrigation connector according to claim 6 further comprising a water outlet portion for accepting water from the interior of the needle and passing water out of the connector wherein the drive mechanism is arranged so that whilst axial drive is transferred to the needle, the drive collar is arranged to rotate freely relative to the water outlet portion.

11. An irrigation connector according to claim 1 comprising a releasable safety lock for selectively blocking movement of the needle from the retracted to the extended position.

12. An irrigation connector according to claim 11 in which the safety lock comprises a moveable plate having a needle blocking portion and including an aperture through which the needle may pass, the moveable plate being moveable between a first, blocking, position where the needle blocking portion blocks movement of the needle towards the extended position and a second position where the needle can pass through the aperture.

13. An irrigation connector according to claim 12 in which the moveable plate is biased towards the blocking position, the moveable plate comprising a spring portion for providing said bias, and the blocking portion and the spring portion being of a single piece of material.

14. An irrigation connector according to claim 1 in which the connector is arranged to block opening of the door portion when the needle is in the extended position.

15. An irrigation connector according to claim 14 further comprising a needle drive arrangement for driving the needle towards the extended position and wherein the drive arrangement is arranged to block opening of the door portion when the needle is in the extended position.

16. An irrigation connector according to claim 15 in which, where the needle drive arrangement comprises a drive collar, the drive collar is arranged to block opening of the door portion when the drive collar is in a position corresponding to the needle being in the extended position.

17. An irrigation connector kit comprising an irrigation connector according to claim 1 and at least two outlet components, each arranged for selective mounting in the outlet portion, one of the outlet components being hose or tubing and another being a dripper unit or a sprinkler unit.

18. An irrigation system comprising a supply hose, and at least two irrigation connectors according to claim 1, each irrigation connector being mounted on the supply hose with the supply hose held in the retaining portion and a fluid communication path created between an interior of the needle and an interior of the supply hose, wherein hose or tubing is held in the water outlet portion of one of the irrigation connectors and a dripper unit or sprinkler unit is held in the water outlet portion of another of the irrigation connectors.

19. An irrigation connector for tapping into a water supply hose, the connector comprising a retaining portion for holding a supply hose, a hollow needle for penetrating a supply hose held in the retaining portion to create a fluid communication path between an interior of the needle and an interior of a supply hose held in the retaining portion and the connector further comprising a water outlet portion for accepting water from the interior of the needle and passing water out of the connector, wherein the water outlet portion comprises a sealing clamp arrangement for connecting an outlet component to the irrigation connector; and wherein the sealing clamp arrangement comprises a tubular sealing element having an internal surface for sealing against an inserted outlet component, a seat portion receiving the tubular sealing element and comprising a plurality of resilient finger portions for acting on an external surface of the sealing element and a clamping nut for driving the resilient finger portions inwardly towards the axis of the sealing element as the clamping nut is tightened onto the seat portion to compress the sealing element into contact with an inserted outlet component.

20. An irrigation connector arrangement comprising an irrigation connector for tapping into a water supply hose, and a ground spike for securing the needle connector in position, wherein the connector comprises a retaining portion for holding a supply hose in a hose receiving region of the retaining portion and a hollow needle mounted for movement relative to the retaining portion between a retracted position and an extended position in which the needle extends into the hose receiving region for penetrating a supply hose held in the retaining portion to create a fluid communication path between an interior of the needle and an interior of a supply hose held in the retaining portion;

wherein the irrigation connector and spike comprise complementary attachment portions allowing the connector to be mounted on the spike and the orientation of the connector to be varied relative to the spike; and wherein the attachment portion on the connector extends at least part way around the retaining portion so as to present a plurality of different angularly spaced attachment regions at which the attachment portion of the spike may be selectively located.

21. An irrigation connector according to claim 20 in which the complementary attachment portions comprise indexing means for indexing relative movement of the attachment portions as the orientation of the connector is altered relative to the spike.

22. An irrigation connector according to claim 21 in which the indexing means comprises a series of projections and recesses on the attachment portion provided on the connector, and a projection on the attachment portion on the spike, which is arranged to ride over a respective one of the projections on the connector as the connector is moved from one indexed position, determined by a respective recess to another.

23. An irrigation connector for tapping into a water supply hose, the connector comprising a retaining portion for holding a supply hose in a hose receiving region of the retaining portion and a hollow needle mounted for movement relative to the retaining portion between a retracted position and an extended position in which the needle extends into the hose receiving region for penetrating a supply hose held in the retaining portion to create a fluid communication path between an interior of the needle and an interior of a supply hose held in the retaining portion, wherein the irrigation connector further comprises a releasable safety lock for selectively locking movement of the needle from the retracted to the extended position.

24. An irrigation connector for tapping into a water supply hose, the connector comprising a retaining portion for holding a supply hose in a hose receiving region of the retaining portion and a hollow needle mounted for movement relative to the retaining portion between a retracted position and an extended position in which the needle extends into the hose receiving region for penetrating a supply hose held in the retaining portion to create a fluid communication path between an interior of the needle and an interior of a supply hose held in the retaining portion, wherein the retaining portion comprises a door portion moveable between a closed position and an open position which creates an opening in a hose supporting surface of the retaining portion for allowing introduction and removal of a length of supply hose and the connector is arranged to block opening of the door portion when the needle is in the extended position.

* * * * *

UNITED STATES PATENT AND TRADEMARK OFFICE
CERTIFICATE OF CORRECTION

PATENT NO. : 10,863,680 B2
APPLICATION NO. : 15/562774
DATED : December 15, 2020
INVENTOR(S) : Boughton et al.

Page 1 of 1

It is certified that error appears in the above-identified patent and that said Letters Patent is hereby corrected as shown below:

In the Claims

Column 11, Line 49: Claim 10, Delete "claim 6" and insert -- claim 1 --

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*